June 8, 1948.  W. O. HAAS, JR  2,442,810
DIELECTRIC MATERIALS
Filed April 13, 1943

INVENTOR.
W. O. HAAS, JR
BY
ATTORNEY

Patented June 8, 1948

2,442,810

UNITED STATES PATENT OFFICE 2,442,810

DIELECTRIC MATERIALS

Walter O. Haas, Jr., Wilmette, Ill., assignor to Western Electric Company, Incorporated, New York, N. Y., a corporation of New York Application April 13, 1943, Serial No. 482,868

1 Claim. (Cl. 117—27)

This invention relates to dielectric materials and to a method of making the same.

Heretofore, mica and other similar materials have been commonly used as the dielectric body in many types of electrical condensers. However, high quality mica suitable for use as the dielectric body in electrical condensers is now difficult to obtain and, also, the preparation of mica to usable form entails considerable work.

Objects of the present invention are to provide an effective and efficient dielectric material and a method of making the same.

In accordance with one embodiment of this invention, a comminuted dielectric material is mixed with a styrene polymer of low molecular weight dissolved in a solvent diluted so that, while it will dissolve a low molecular weight styrene, it will not readily attack one having a substantially higher molecular weight. This composition is then coated on a film of polystyrene having a substantially higher molecular weight.

Figure 1:
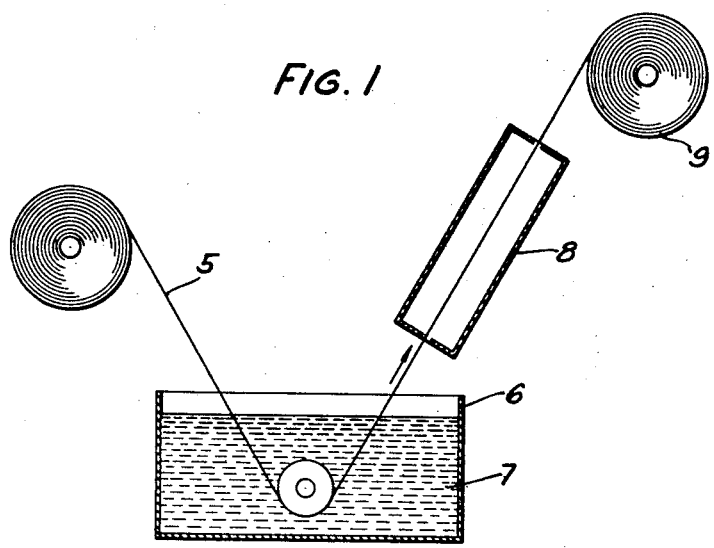
Figure 2:
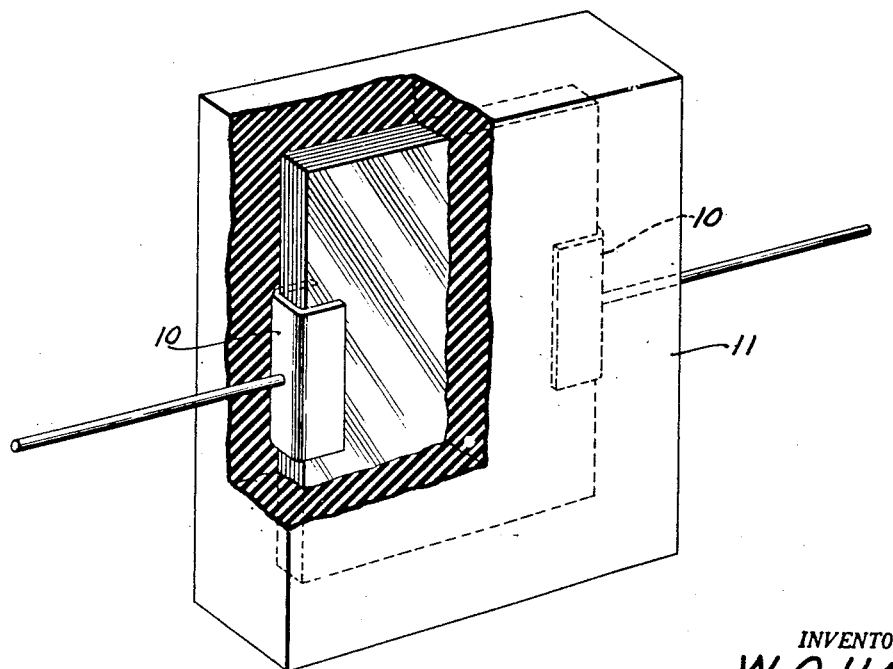

Other objects and advantages of the present invention will be apparent from the following detailed description taken in conjunction with the following drawings, wherein Fig. 1 is a diagrammatic view of a coating apparatus which may be used in practicing this invention; and Fig. 2 is a perspective view, partly in section, of an electrical condenser made in accordance with this invention.

In order to provide a dielectric body which will have satisfactory electrical and physical properties, a high dilectric constar material having a suitable low loss characteristic, such as titanium dioxide or various titanates of the alkaline earths, may be coated on a suitable film and the particles of the dilectric material held together and held to the basic film by a suitable binder. Polystyrene, because of its exceptionally low loss characteristic provides a desirable base material and, in addition, in accordance with the present invention, may also be used as a binder material to hold the particles of dielectric material together and to the base.

As shown in Fig. 1 of the drawings, in producing a dielectric body, a strip 5 of base material, such as a film of polystyrene, may be passed through a tank 6 containing the coating compound 7, then through an oven 8 to dry the coating by evaporating the binder solvent, and finally wound on a drum 9. The film must remain strong enough throughout the coating and drying to resist rupture as it is pulled along. When employing polystyrene as a binder for a powdered dielectric material, such as titanium dioxide and other well known high dielectric constant materials, the polystyrene may be dissolved in a suitable solvent, such, for example, as carbon tetrachloride. However, if a coating composition comprising powdered dielectric material in a binder of polystyrene dissolved in carban tetrachloride is applied to a base of polystyrene, the carbon tetrachloride will attack the polystyrene base as well as dissolve the binder of polystyrene and the base may be weakened to such an extent that it will rupture before the solvent is evaporated.

In order to overcome this difficulty, in accordance with the present invention, a monomeric styrene to be used as a binder material is polymerized by heating at a high temperature to obtain a low molecular weight polymer which will have a higher solubility than the polymeric styrene to be used as a base, the lower molecular weight polymers being relatively more soluble than the higher molecular weight polymers. The binder styrene, prepared as described, is then mixed with the dielectric material together with a suitable solvent for the styrene. This solvent is diluted to reduce its concentration so that while it will hold in solution the more highly soluble binder styrene, it will not readily attack the relatively less soluble base styrene.

In practicing this invention, monomeric styrene may be heated and polymerized to obtain a molecular weight on the order of 1500 to 15,000. The monomeric styrene to be used as a base is polymerized to have a substantially higher molecular weight, that is, a weight on the order of 30,000 to 300,000. While the minimum difference has not yet been established, satisfactory results may be obtained where the base polymer has a molecular weight three or more times that of the binder polymer. The more highly soluble polystyrene, that is the lower molecular weight polystyrene, may then be dissolved by mixing it in a ball mill with carbon tetrachloride, or other suitable solvent material, and then adding a diluent, such as butyl alcohol, which will not attack the polystyrene and which is as volatile, or less volatile, than the carbon tetrachloride. It will be apparent that if a diluent were used which were more volatile than the solvent, then, as the diluent evaporated, evaporating more rapidly than the solvent because of its greater volatility, the concentration of the solvent would increase and gradually become sufficient to dissolve the base as well as the binder.

In practice, it has been found that if not more than 70% carbon tetrachloride is present and the rest diluent, the carbon tetrachloride will not readily attack polystyrene having a molecular weight on the order of 100,000, but will maintain in solution polystyrene having a molecular weight on the order of 5000. The maximum amount of diluent is used which will not cause the solvent to precipitate the binder material dissolved therein in order to obtain a saturated solution, since the solvent action is substantially reduced by the presence of the solute in maximum amount. It will be understood, of course, that these figures are merely illustrative and that if other molecular weight polystyrenes, or other solvents, be employed, the maximum permissible concentration of the solvent would vary.

After the film has been coated, dried and calendered, it may then be cut into sheets and assembled between sheets of foil. A pair of terminal clamps 10, as shown in Fig. 2, may be clamped to either end of the assembly. Sometimes it is then desirable to mold a casing 11 of a material, such as a phenolic condensation product, about the assembly. This is done under considerable heat and pressure. However, many thermoplastic materials suitable for use as base materials, and particularly polystyrene, when heated, lose their shape. For example, ordinarily if a film of polystyrene is heated to 180° F., as it may be when a casing is molded around it, it will shrivel and shrink almost into the form of a pellet. When a casing is molded about a condenser assembly comprising alternate laminations of coated polystyrene film and foil, the shrinkage of the film may sometimes cause ruptures which will short circuit the condenser.

As stated in the co-pending application of F. B. Hodgdon, Serial No. 482,866, filed April 13, 1943, a polystyrene film coated with the dielectric coating composition hereinbefore described may, after calendering, be heated to a temperature on the order of 350° F. to relieve the strains in the polystyrene film, the coating preventing the polystyrene from changing shape during the heat treatment. Thereafter, the coated film may be heated as may be required in molding and will retain its shape. The film has high tensile strength and will retain its shape during the molding operation at ordinary molding temperatures.

While this invention has been described in connection with the use of polystyrene as a base material and also as a binder, it will be understood that many other materials may be similarly treated to obtain substantially differing solubilities and consequently may be employed in place of the polystyrene.

What is claimed is:

A method of making a condenser dielectric comprising dissolving a polystyrene having a molecular weight on the order of 1500 to 15,000 in a solvent, diluting the solvent, said solvent and diluent constituting a liquid vehicle of approximately 70% carbon tetrachloride and 30% butyl alcohol, mixing the dissolved polystyrene with comminuted titanium dioxide, coating a film of polystyrene having a molecular weight on the order of 30,000 to 300,000 with the mixture, and drying the coating.

WALTER O. HAAS, Jr.

REFERENCES CITED

The following references are of record in the file of this patent:

UNITED STATES PATENTS

| Number | Name | Date |
| --- | --- | --- |
| 1,777,309 | Hopkinson | Oct. 7, 1930 |
| 2,177,266 | Schupp | Oct. 24, 1939 |
| 2,281,602 | Ruben | May 5, 1942 |

FOREIGN PATENTS

| Number | Country | Date |
| --- | --- | --- |
| 504,571 | Great Britain | Apr. 27, 1939 |

OTHER REFERENCES

Morrell, Synthetic Resins and Allied Plastics, 1st ed., 1937, page 321, table.

Meyer, Natural and Synthetic High Polymers, vol. IV, 1942, page 115, table 8.

Morrell, Synthetic Resins and Allied Plastics, 2nd ed., 1943, page 195, lines 29–35.